US007472426B2

(12) United States Patent
Okamoto

(10) Patent No.: US 7,472,426 B2
(45) Date of Patent: Dec. 30, 2008

(54) AUTOMATIC PERFORMANCE DATA EDITING AND REPRODUCING APPARATUS, CONTROL METHOD THEREFOR, AND PROGRAM FOR IMPLEMENTING THE CONTROL METHOD

(75) Inventor: Tetsuo Okamoto, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/386,563

(22) Filed: Mar. 22, 2006

(65) Prior Publication Data

US 2006/0225562 A1 Oct. 12, 2006

(30) Foreign Application Priority Data

Mar. 23, 2005 (JP) ............................. 2005-084880

(51) Int. Cl.
*G06F 7/04* (2006.01)
*G10H 7/00* (2006.01)

(52) U.S. Cl. ............................. 726/30; 84/609; 84/622

(58) Field of Classification Search ................... 84/609, 84/622; 705/51, 57; 726/26, 27, 28, 29, 726/30, 31, 32, 33

See application file for complete search history.

(56) References Cited

U.S. PATENT DOCUMENTS 5,646,999 A * 7/1997 Saito ........................... 705/54
5,734,119 A 3/1998 France et al.
5,765,152 A * 6/1998 Erickson ......................... 707/9
5,848,158 A * 12/1998 Saito et al. ..................... 705/54
5,850,050 A 12/1998 Isozaki et al.
5,857,856 A 1/1999 Azuma
6,600,098 B2 7/2003 Mizuno et al.
6,744,894 B1 * 6/2004 Saito .......................... 380/277
6,884,933 B2 4/2005 Akahori et al.
6,956,161 B2 10/2005 Kondo
7,223,911 B2 * 5/2007 Nakayama ................... 84/602
7,268,287 B2 9/2007 Kawashima (Continued)

FOREIGN PATENT DOCUMENTS

JP 05-232938 A 10/1993

(Continued)

*Primary Examiner*—Lincoln Donovan
*Assistant Examiner*—Andrew R Millikin
(74) *Attorney, Agent, or Firm*—Rossi, Kimms & McDowell, LLP

(57) ABSTRACT

An automatic performance data editing and reproducing apparatus which can achieve harmony between a copyright holder of automatic performance data and users thereof. At least part of a plurality of pieces of part performance data stored in a storage device that stores automatic performance data comprising a plurality of pieces of part performance data and stores identifiers indicative of whether the part performance data is data of which reproduction is to be limited as attachment to at least part of the plurality of pieces of part performance data is read out and edited. The automatic performance data including the edited part performance data is reproduced. In the case where part performance data to be edited turns out to be data of which reproduction should be limited with reference to an identifier thereof, a condition for removing a limitation on the reproduction of the part performance data is generated and attached to the edited part performance data in editing the part performance data to be edited, and if the condition is satisfied, the limitation on the reproduction of the part performance data is removed to reproduce the part performance data.

11 Claims, 10 Drawing Sheets

U.S. PATENT DOCUMENTS

| | | | | |
|---|---|---|---|---|
| 2001/0029832 | A1 * | 10/2001 | Kanda et al. | 84/609 |
| 2003/0029304 | A1 | 2/2003 | Ochi | |
| 2003/0177888 | A1 * | 9/2003 | Akahori et al. | 84/609 |
| 2004/0210765 | A1 * | 10/2004 | Erickson | 713/200 |
| 2006/0064381 | A1 * | 3/2006 | Tamori | 705/51 |
| 2006/0215842 | A1 | 9/2006 | Okamoto | |

FOREIGN PATENT DOCUMENTS

| | | | | |
|---|---|---|---|---|
| JP | 07-306687 | A | | 11/1995 |
| JP | 2000-153076 | A | | 6/2000 |
| JP | 2001229281 | A | * | 8/2001 |
| JP | 2002-091440 | A | | 3/2002 |
| JP | 2004-045706 | A | | 2/2004 |
| JP | 2006072422 | A | * | 3/2006 |

* cited by examiner

AUTOMATIC PERFORMANCE DATA EDITING AND REPRODUCING APPARATUS, CONTROL METHOD THEREFOR, AND PROGRAM FOR IMPLEMENTING THE CONTROL METHOD

BACKGROUND OF THE INVENTION

1. Field of the Invention

The present invention relates to an automatic performance data editing and reproducing apparatus which is capable of editing automatic performance data and reproducing the edited automatic performance data, a control method therefor, and a program for implementing the control method.

2. Description of the Related Art

Conventionally, there have been known automatic performance data editing and reproducing apparatuses which are capable of editing automatic performance data and reproducing the edited automatic performance data.

Such automatic performance data editing and reproducing apparatuses include one which is capable of editing a plurality of kinds of accompaniment pattern data and automatically reproducing the edited accompaniment pattern data (see Japanese Laid-Open Patent Publication (Kokai) No. H05-232938, for example).

The above conventional automatic performance data editing and reproducing apparatus, however, has the disadvantage that accompaniment pattern data read into the apparatus can be freely edited, and hence even if accompaniment pattern data to be edited is one created by a third party other than a person who is trying to edit the data and the third party does not want other persons to use the accompaniment pattern data to be edited, the accompaniment pattern data can be freely edited against the third party's intension.

Also, automatic performance data on which usage limitations are imposed (typically copy protected) are distributed, but such usage limitations are intended for the whole of automatic performance data, not for part of the automatic performance data. It is therefore impossible to deal with a case where only part of automatic performance data is copyrighted and a case where a copyright holder of automatic performance data intends to copyright only part of automatic performance data (that is, the rest of the automatic performance data is allowed to be freely used by third parties) since a usage limitation is imposed on the whole of automatic performance data.

SUMMARY OF THE INVENTION

It is an object of the present invention to provide an automatic performance data editing and reproducing apparatus and a control method therefor which can achieve harmony between a copyright holder of automatic performance data and users thereof, as well as a program for implementing the control method.

To attain the above object, in a first aspect of the present invention, there is provided an automatic performance data editing and reproducing apparatus comprising a storage device that stores automatic performance data comprising a plurality of pieces of part performance data and stores identifiers indicative of whether the part performance data is data of which reproduction is to be limited, the identifiers being attached to at least part of the plurality of pieces of part performance data, a readout device that read out at least part of the plurality of pieces of part performance data stored in the storage device, an editing device that edits the part performance data read out by the readout device, and a reproducing device that reproduces the automatic performance data including the part performance data edited by the editing device, wherein in a case where part performance data to be edited turns out to be data of which reproduction is to be limited with reference to an identifier thereof, in editing the part performance data to be edited, the editing device generates a condition for removing a limitation on the reproduction of the part performance data and attaches the generated condition to the edited part performance data, and if the condition is satisfied, the reproducing device removes the limitation on the reproduction of the part performance data to reproduce the part performance data with the condition attached thereto.

With the arrangement of the automatic performance data editing and reproducing apparatuses in the first aspect of the present invention, in the case where part performance data to be edited is data of which reproduction should be limited with reference to an identifier thereof, in editing the part performance data to be edited, a condition for removing the limitation on the reproduction of the part performance data is generated and attached to the edited part performance data, and if the condition is satisfied, the limitation on the reproduction of the part performance data is removed to reproduce the part performance data. As a result, it is possible to achieve harmony between a right holder of automatic performance data and users thereof.

Preferably, the readout device reads out a copy of original part performance data while leaving the original part performance data as it is, and the editing device edits the copy of the original part performance data read out by the readout device, and in a case where the condition is generated, generates a condition that the original part performance data is stored in the automatic performance data editing and reproducing apparatus.

More preferably, the readout device reads out the copy of the original part performance data edited by the editing device, and the editing device edits the edited copy of the original part performance data read out by the readout device, and in a case where the condition is generated, generates a condition that the original part performance data is stored in the automatic performance data editing and reproducing apparatus.

Preferably, the automatic performance data editing and reproducing apparatus further comprises a selecting device that selects either one of a forced reproduction mode and a normal reproduction mode, and in reproducing the automatic performance data including the part performance data with the condition attached thereto, the reproducing device limits reproduction of the part performance data with the condition attached thereto when the condition is unsatisfied and the forced reproduction mode is selected by the selecting device, and carries out normal reproduction of other part performance data, and on the other hand, limits reproduction of the entire automatic performance data when the condition is unsatisfied and the normal reproduction mode is selected by the selecting device.

Preferably, the plurality of pieces of part performance data include part performance data used for an introduction part of a musical composition, part performance data used for a main part of the musical composition, part performance data used for break parts of the musical composition, and part performance data used for an ending part of the musical composition.

Preferably, the contents of the identifiers are set by a creator of the automatic performance data.

To attain the above object, in a second aspect of the present invention, there is provided a control method for an automatic performance data editing and reproducing apparatus, comprising a readout step of reading out at least part of a plurality of pieces of part performance data stored in a storage device that stores automatic performance data comprising a plurality of pieces of part performance data and stores identifiers indicative of whether the part performance data is data of which reproduction is to be limited, the identifiers being attached to at least part of the plurality of pieces of part performance data, an editing step of editing the part performance data read out in the readout step, and a reproducing step of reproducing the automatic performance data including the part performance data edited in the editing step, wherein in a case where part performance data to be edited turns out to be data of which reproduction is to be limited with reference to an identifier thereof, in editing the part performance data to be edited, a condition for removing a limitation on the reproduction of the part performance data is generated and attached to the edited part performance data in the editing step, and in the reproducing step, if the condition is satisfied, the limitation on the reproduction of the part performance data is removed to reproduce the part performance data with the condition attached thereto.

According to the second aspect of the present invention, the same effects as those obtained by the automatic performance data editing and reproducing apparatus according to the first aspect of the present invention can be obtained.

To attain the above object, in a third aspect of the present invention, there is provided a program for causing a computer to execute the control method according to the second aspect of the present invention.

According to the third aspect of the present invention, the same effects as those obtained by the automatic performance data editing and reproducing apparatus according to the first aspect of the present invention can be obtained.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
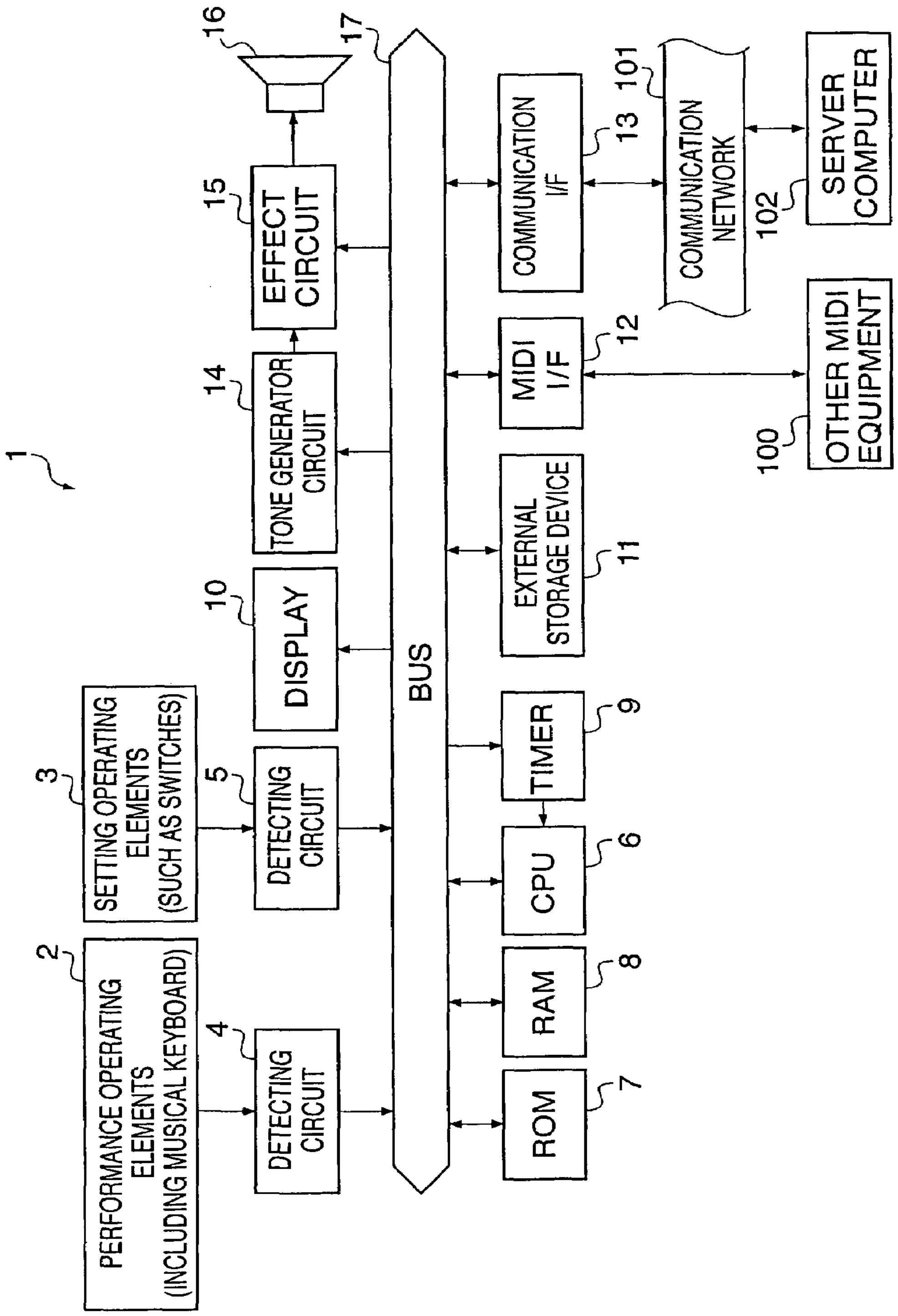
FIG. 1 is a block diagram schematically showing the arrangement of an automatic performance data editing and reproducing apparatus according to an embodiment of the present invention.

FIG. 1 is a block diagram schematically showing the arrangement of an automatic performance data editing and reproducing apparatus according to an embodiment of the present invention.

As shown in FIG. 1, the automatic performance data editing and reproducing apparatus 1 is comprised of performance operating elements 2 including a musical keyboard for inputting pitch information; setting operating elements 3 including a numerical keyboard, a mouse, and various switches for inputting various information; a detecting circuit 4 for detecting operative states of the performance operating elements 2; a detecting circuit 5 for detecting operative states of the setting operating elements 3; a CPU 6 that controls the entire apparatus; a ROM 7 that stores control programs executed by the CPU 6, various table data, etc.; a RAM 8 for temporarily storing automatic performance data, various input information, computation results, etc.; a timer 9 that measures an interrupt time for timer interrupt processing and various kinds of time; a display 10 comprised of a liquid crystal display (LCD) or a CRT (Cathode Ray Tube) display, light emitting diodes (LEDs), etc., for displaying various information and others; an external storage device 11 that stores various application programs including control programs, various musical composition data, various other data, etc.; a MIDI interface (I/F) 12 that inputs MIDI (Musical Instrument Digital Interface) messages from external devices and outputs MIDI messages to external devices; a communication interface (I/F) 13 that performs transmission and reception of data to and from a server computer (hereinafter simply referred to as “the server”) 102 via a communication network 101; a tone generator circuit 14 that converts performance data input by the performance operators 2, preset performance data, and other data into musical tone signals; an effect circuit 15 that applies various effects to musical tone signals from the tone generator circuit 14; and a sound system 16 that converts musical tone signals from the effect circuit 15 into sounds and is comprised of a DAC (Digital-to-Analog Converter), an amplifier, a speaker, etc.

The above component elements 4 to 15 are connected to one another via a bus 17. The timer 9 is connected to the CPU 6, other MIDI equipment 100 to the MIDI I/F 12, the communication network 101 to the communication I/F 13, the effect circuit 15 to the tone generator circuit 14, and the sound system 16 to the effect circuit 15, respectively. Here, the communication I/F 13 and the communication network 101 should not necessarily be wired, but may be wireless. Alternatively, one may be wired and the other may be wireless.

The external storage device 11 may be implemented, for example, by a flexible disk drive (FDD), a hard disk drive (HDD), a CD-ROM drive, or a magnetic-optical disk (MO) drive. The external storage device 11 may store the control programs executed by the CPU 6 as mentioned above. If one or more of the control programs are not stored in the ROM 7, the control program(s) may be stored in the external storage device 11, and by reading out the control program(s) from the external storage device 11 and storing the same in the RAM 8, the CPU 6 can operate in the same manner as if the control program(s) were stored in the ROM 7. This enables adding control programs and upgrading the version of the control programs with ease.

The MIDI I/F 12 need not be a dedicated one, but may be implemented by a universal interface such as RS-232C, USB (Universal Serial Bus), and IEEE1394. In this case, data other than MIDI message data may be transmitted and received simultaneously via the MIDI I/F 12.

As mentioned above, the communication I/F 13 is connected to the communication network 101 which may be a LAN (Local Area Network), the Internet, a telephone line, or the like, for connection to the server 102 via the communication network 101. When one or more of the above programs and various parameters are not stored in the external storage device 11, the communication I/F 13 is used to download such programs and parameters from the server 102. The automatic performance data editing and reproducing apparatus 1 as a client transmits a command or commands for downloading one or more programs and parameters to the server 102 via the communication I/F 13 and the communication network 101. In response to the command(s), the server 102 distributes the requested program(s) and parameters to the automatic performance data editing and reproducing apparatus 1 via the communication network 101, and the automatic performance data editing and reproducing apparatus 1 receives the program(s) and parameters via the communication I/F 13 and stores them in the external storage device 11, thus completing the download.

In the present embodiment, the server 102 is a Web server that distributes contents (Web page data). The Web server 102 may be comprised of the same component elements as those of the automatic performance data editing and reproducing apparatus 1, but the performance operators 2, detecting circuit 4, and MIDI I/F 12 may be omitted because they are not essential elements. In general, a server computer is used as the Web server 102.

Figure 2:
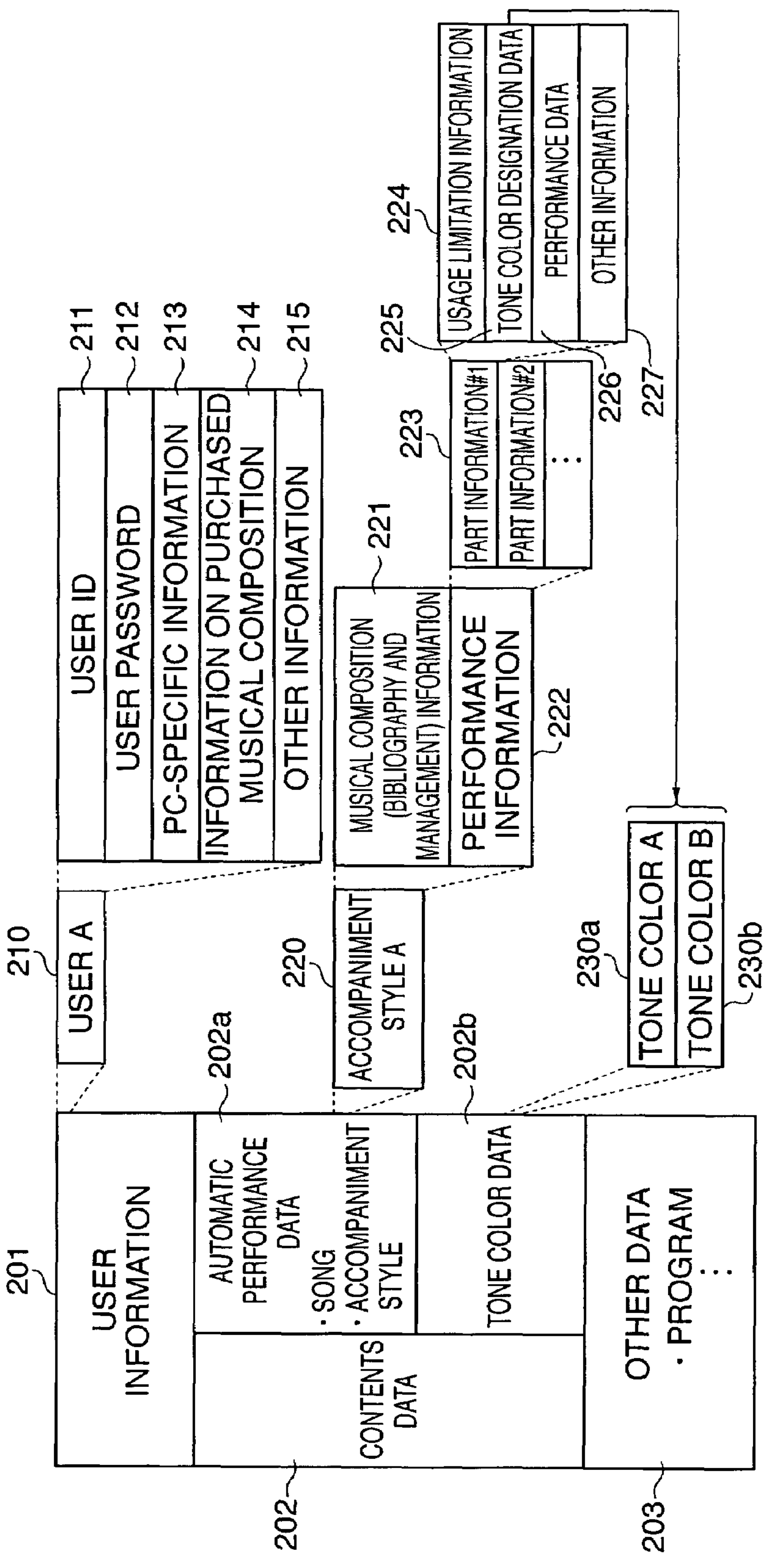
FIG. 2 is a diagram showing an example of storage contents stored in an external storage device of a Web server appearing in FIG. 1.

FIG. 2 is a diagram showing an example of storage contents stored in an external storage device, not shown, of the Web server 102.

As shown in FIG. 2, the external storage device of the Web server 102 stores user information 210, contents data 202, and other data 203.

The user information 201 is information relating to users who can access the Web server 102 to receive various services provided by the Web server 102. One piece of user information 201 is stored for one user. A plurality of persons are usually registered as users who can access the Web server 102, but in FIG. 2, user information 210 for a user A is illustrated as a representative example since user information for respective users may be in the same format.

The user information 201 is comprised of a user ID 211, a user password 212, information 213 specific to a PC (personal computer) used by the concerned user in accessing the Web server 102, information 214 about musical compositions that have already been purchased by the concerned user (such as the titles of musical compositions and the dates and times of purchases), and other information 215.

The contents data 202 is comprised of automatic performance data 202*a* and tone color data 202*b*. The automatic performance data 202*a* is comprised of a plurality of pieces of song data and a plurality of pieces of accompaniment style data. The song data is data for sounding the melody of a musical composition, and the accompaniment style data is data for sounding accompaniments of musical compositions. Although in the present embodiment, the accompaniment style data is taken as an example to describe the features of the present invention for the convenience of explanation, the present invention may be applied to the song data as is the case with the accompaniment style data.

The accompaniment style data is prepared in advance for each of various accompaniment styles such as 8-beat, 16-beat, dance, jazz, and R&B. All the pieces of the accompaniment style data may be in the same format, and hence in FIG. 2, accompaniment style data 220 for an accompaniment style A ("A" corresponds to any of the various accompaniment styles (such as 8-beat, 16-beat, dance, jazz, and R&B)) is shown as a representative example.

The accompaniment style data 220 is comprised of musical composition information 221 and performance information 222. The musical composition information 221 includes bibliographical information such as the name of the concerned accompaniment style data 220, the tempo at which the concerned accompaniment style data 220 is reproduced, and the key based on which the accompaniment style data 220 is reproduced, and management information such as information (address information) indicative of the storage location of the performance information 222 included in the concerned accompaniment style data 220. The performance information 222 is comprised of a plurality of pieces of part information #k (k=1, 2, . . . ) 223. Examples of the part information #k 223 include information used for the "Intro" part of a composition, information used for the "Main" part of the composition, information used for "Break" parts that break the stream of a composition so as to augment performance, and information used for the "Ending" part of the composition. Where an accompaniment composition is comprised of a plurality of parts (tone colors), the part information #k 223 may be associated with data of the respective parts.

Each piece of the part information #k 223 is comprised of usage limitation information 224, tone color designation data 225, performance data 226, and other information 227.

The usage limitation information 224 includes information indicative of whether or not the usage of the concerned part information #k 223 is limited, and also includes parts type information indicative of the type of the concerned part information #k 223 if the usage of the concerned part information #k 223 is limited. The information indicative of whether or not the usage of the concerned part information #k 223 is limited is comprised of, for example, a flag (hereinafter referred to as "the usage limitation flag"). If the usage limitation flag assumes "1", this means that the usage of the concerned part information #k 223 is limited, and if the usage limitation flag assumes "0", this means that the usage of the concerned part information #k 223 is not limited. When the usage limitation flag is set to "1", the usage of the concerned part information #k 223 is limited; in the present embodiment, this usage limitation means inhibiting the reproduction of the concerned part information #k 223. Even in the case where the usage limitation flag is set to "1", however, the concerned part information #k 223 can be reproduced if the concerned part information #k 223 is unedited part information (hereinafter referred to as "parent part information") (i.e. original part information created by a right holder) or edited part information (hereinafter referred to as "child part information"), and the parent part information is stored in the same apparatus as the one in which the concerned part information #k 223 (i.e. child part information) is stored. Thus, when the concerned part information #k 223 is parent part information, the information that the concerned part information #k 223 is parent part information is set, and when the concerned part information #k 223 is child part information, the information that the concerned part information #k 223 is child part information is set. Further, when the information that the concerned part information #k 223 is child part information is set, and parent part information thereof is stored in the same apparatus as the one in which the concerned part information #k 223 is stored, information indicative of the location at which the parent part information is stored is also set. Thus, the usage of the concerned part information #k 223 is limited to inhibit the reproduction thereof when all the following conditions (1) to (3) are satisfied:

(1) The usage limitation flag=1

(2) The concerned part information #k 223 is child part information (3) Information indicative of the location at which parent part information thereof is not set It should be noted that the usage limitation is not limited to a limitation on reproduction, but may be other types of limitations such as a limitation on edition. Thus, when there are a plurality of types of limitations, and it is configured such that any one is selected from the plurality of types of limitations, the selected limitation type may be written in usage limitation information.

The tone color designation data 225 designates the locations of tone color data (in the illustrated example, tone color data 230*a* and 230*b* corresponding to tone colors A and B, respectively) used in the concerned part information #k 223.

The performance data 226 is comprised of a sequence of a plurality of sets each consisting of event data such as a key-on event, a key-off event, and a tone color designation event, and timing data indicative of the reproduction timing of the event data.

Examples of the other information 227 include information indicative of which part of an accompaniment composition corresponds to the concerned part information #k 223, and a unique name given to the concerned part information #k 223.

Examples of the other data 203 include control programs executed by a CPU, not shown, of the Web server 102.

Next, control processes carried out by the automatic performance data editing and reproducing apparatus 1 and the Web server 102 constructed as described above will be outlined first and then described in detail with reference to FIGS. 3 to 10.

The automatic performance data editing and reproducing apparatus 1 mainly carries out the following processes (i) to (iii):

(i) A data receiving process in which automatic performance data requested to be transmitted is received from the Web server 102, and if the received automatic performance data includes tone color designation data and tone color data designated by the tone color designation data is not stored in the automatic performance data editing and reproducing apparatus 1, the tone color data is received from the Web server 102

(ii) An editing process in which in editing at least one piece of part information selected from among a plurality of pieces of part information constituting the automatic performance data received in the data receiving process (i), if the usage limitation flag for the part information to be edited assumes "1", usage limitation information is generated and stored for the edited part information (child part information) as well (iii) An automatic performance process in which in automatically performing the child part information, the contents of the usage limitation information on the child part information are checked, and if, as a result, it is determined that the corresponding usage limitation flag assumes "1" and information indicative of the location at which the corresponding parent part information is stored is not set, the reproduction of the child part information or the entire automatic performance data including the child part information is stopped The Web server 102 mainly carries out the following processes (I) and (II):

(I) An authenticating process in which a user (client apparatus) who has requested connection is authenticated (II) A distributing process in which automatic performance data and tone color data of which transmission has been requested by the automatic performance data editing and reproducing apparatus 1 authenticated in the above authenticating process (I) are distributed to the automatic performance data editing and reproducing apparatus 1

A detailed description will now be given of the above control processes.

Figure 3:
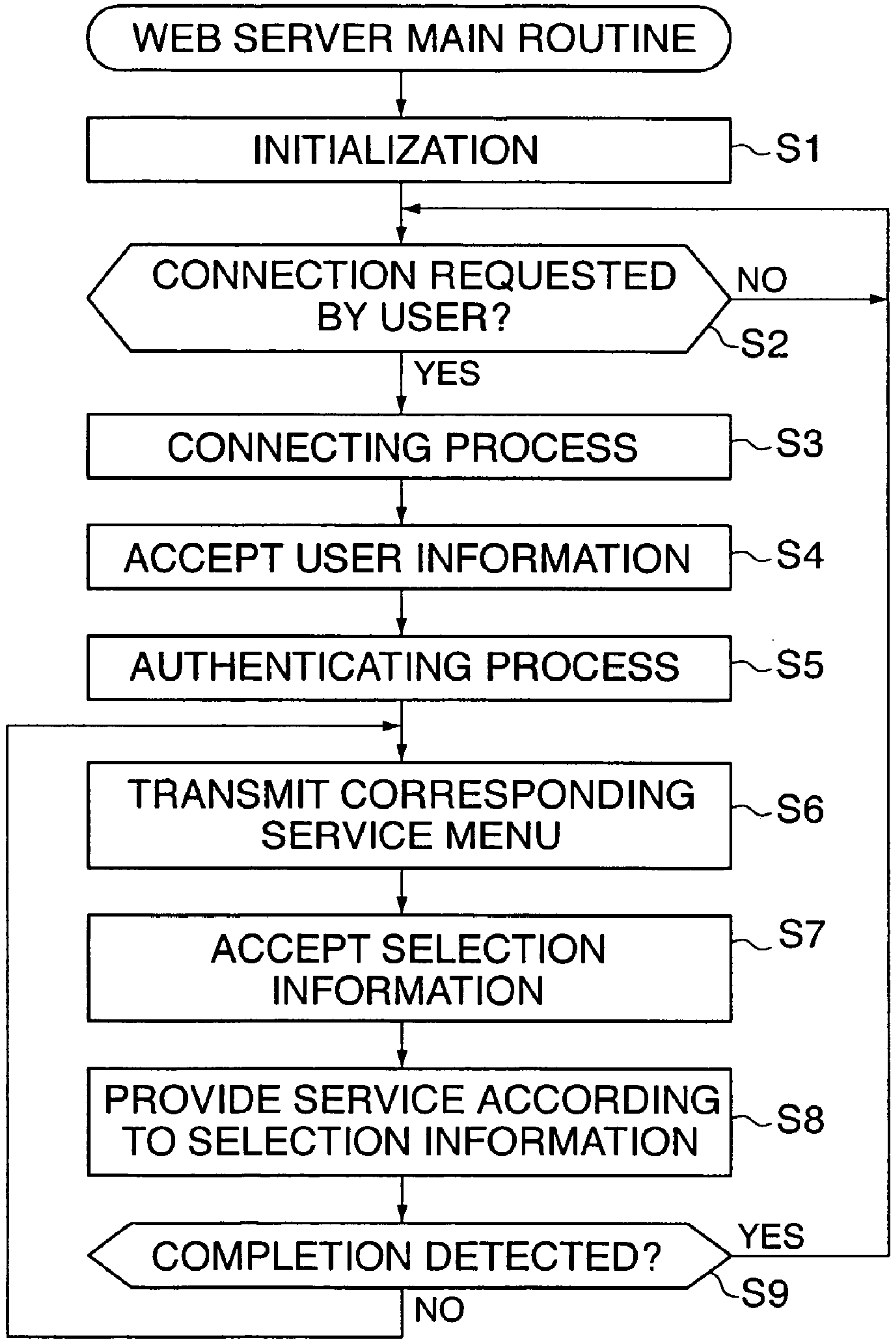
FIG. 3 is a flow chart showing the procedure of a main routine executed by the Web server appearing in FIG. 1, particularly a CPU thereof.

FIG. 3 is a flow chart showing the procedure of a main routine executed by the Web server 102, particularly by the CPU thereof. The main routine is started, for example, when power supply to the Web server 102 is turned on. It should be noted that the main routine in FIG. 3 includes the above processes (I) and (II).

As shown in FIG. 3, an initialization process in which, for example, a RAM, not shown, is cleared, and connection with the above-mentioned communication network 101 is established is carried out (step S1).

Next, whether a user (a client apparatus including the automatic performance data editing and reproducing apparatus 1) tries to establish connection with the Web server 102 via the communication network 101 (i.e. whether or not there is a connection request) is monitored (step S2). If there is the connection request, a connecting process in which connection with the user's apparatus is established is carried out (step S3). Specifically, the connecting process is a process in which the communications protocol of the Web server 102 and the communications protocol of the user's apparatus are made consistent with each other, and then Web page data to which a user ID and a password can be input is transmitted to the user's apparatus.

The user's apparatus displays the received Web page data. When the user inputs his/her user ID and password to the displayed Web page, the user ID and the password are transmitted from the user's apparatus to the Web server 102 via the communication network 101. As a result, the Web server 102 receives the input user ID and password (user information) (step S4) and carries out the authenticating process in which the input user ID and password are compared with a user ID and a password, respectively, stored in the Web server 102, and if they match, connection from the user's apparatus is permitted (step S5). It should be noted that an acquisition request to acquire information specific to the user's apparatus (information corresponding to the above-mentioned specific information 213) is transmitted to the user's apparatus from which connection has been permitted in the authenticating process, and the information specific to the user's apparatus transmitted from the user's apparatus in response to the acquisition request is received. The received information specific to the user's apparatus is stored at the corresponding location in the concerned user information (the location at which the specific information 213 is stored in the user information 201).

The reason why such information specific to the user's apparatus is acquired is as follows:

(a) To determine services to be provided and the type of data to be transmitted according to the information specific to the user's apparatus (b) To detect a compression method supported by the user's apparatus from the information specific to the user's apparatus, compress the automatic performance data using the detected compression method, and transmit the compressed automatic performance data, because when automatic performance data is transmitted from the Web server 102, the automatic performance data needs to compressed before being transmitted if the volume thereof is large, but there are various compression methods and all of them are not necessarily supported by the user's apparatus Next, Web page data for displaying a service menu adapted to the user's apparatus which is currently permitted to establish connection with the Web server 102 is transmitted to the user's apparatus (step S6). The service menu adapted to the user's apparatus is a list of services, data types (see the above (a)), and compression methods (see the above (b)) that can be handled by the user's apparatus.

Upon receiving the Web page data, the user's apparatus displays a service menu displayed based upon the Web page data. When the user selects a desired service, the type of data desired to be distributed, and a compression method therefor, selection information indicative of the selected items is transmitted from the user's apparatus to the Web server 102.

The web server 102 accepts the selection information (step S7) and supplies (or distributes) a service according to the selection information (or automatic performance data of which type or compression method corresponds to the selection information) to the user's apparatus (step S8).

The steps S6 to S8 are repeatedly executed until the completion of the routine is detected when a completion signal is received from the user's apparatus or a predetermined period of time has elapsed with no selection information transmitted from the user's apparatus. On the other hand, when the completion of the routine is detected, the process returns to the step S2.

In the above described manner, when the user's apparatus is permitted to establish connection with the Web server 102 and the user thereof selects the accompaniment style data 220 as automatic performance data and requests the Web server 102 to distribute the accompaniment style data 220, the Web server 102 reads out the accompaniment style data 220 stored in the external storage device thereof, compresses the readout accompaniment style data 220 using a compression method selected by the user, and transmits the compressed accompaniment style data 220 to the user's apparatus.

Figure 4:
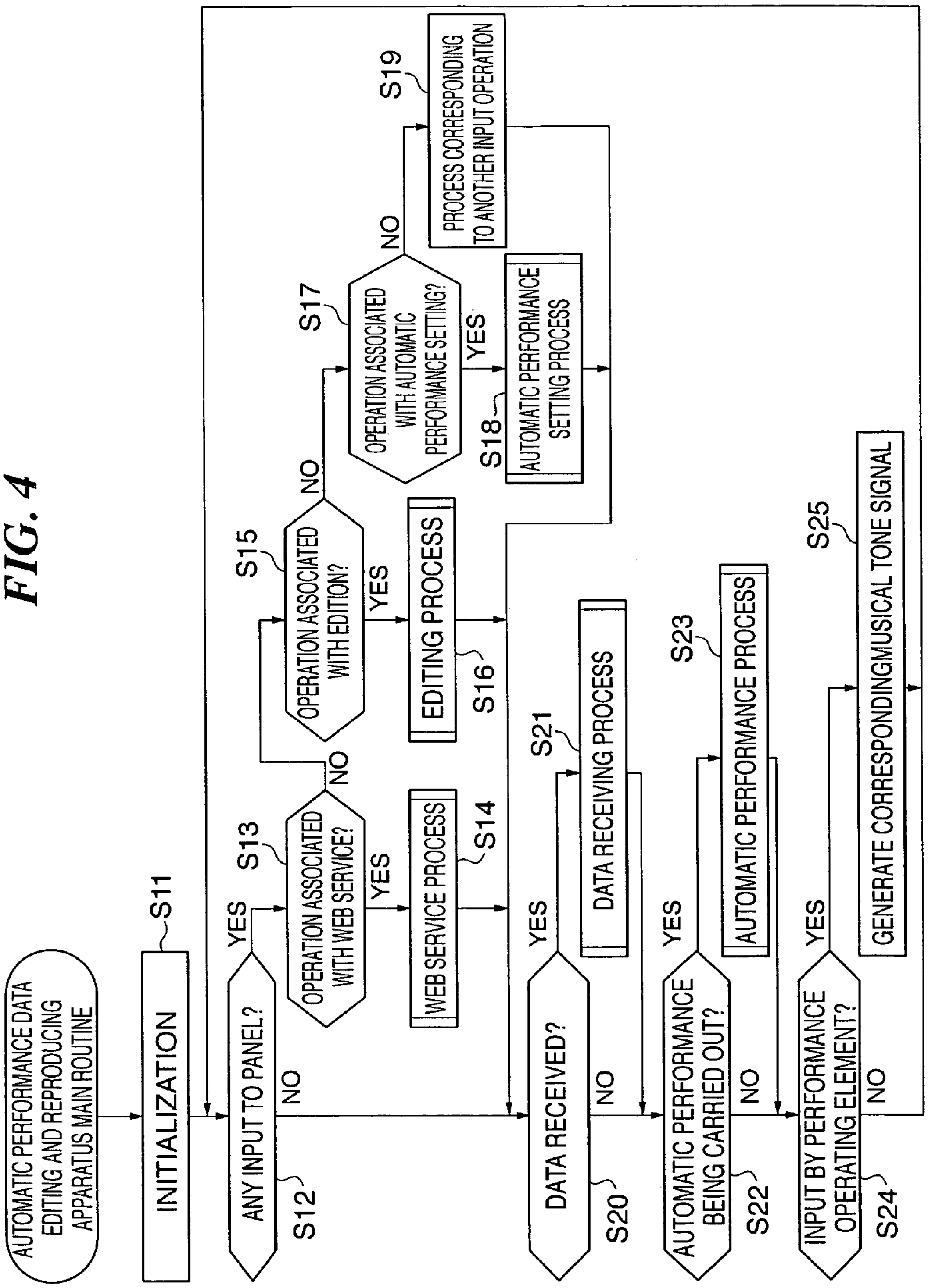
FIG. 4 is a flow chart showing the procedure of a main routine executed by the automatic performance data editing and reproducing apparatus in FIG. 1, particularly a CPU thereof.

FIG. 4 is a flow chart showing the procedure of a main routine executed by the automatic performance data editing and reproducing apparatus 1, particularly the CPU 6. In this main routine, the following processes (A) to (E) are mainly carried out:

(A) An initialization process (step S11)

(B) A setting operating element process carried out when any of the setting operating elements 3 provided on a panel, not shown, is operated (steps S13 to S19);

(C) A data receiving process in which data distributed from the Web server 102 is received (step S21);

(D) An automatic performance process carried out since the start of automatic performance is instructed and until the termination thereof is instructed (step S23); and (E) A process in which, when any of the performance operating elements 2 is operated, a musical tone signal corresponding to the operated performance operating elements 2 is generated (step S25)

The setting operating element process (B) includes any of the following processes (B1) to (B4) depending on which setting operating element is operated:

(B1) A Web service process carried out when a setting operating element associated with a Web service is operated (step S14)

(B2) An editing process carried out when a setting operating element associated with the edition of automatic performance data is operated (step S16)

(B3) An automatic performance setting process carried out when a setting operating element associated with the setting of automatic performance is operated (step S18)

(B4) A process in which any setting operating element other than the setting operating elements operated in the above processes (B1) to (B3)

Figure 5:
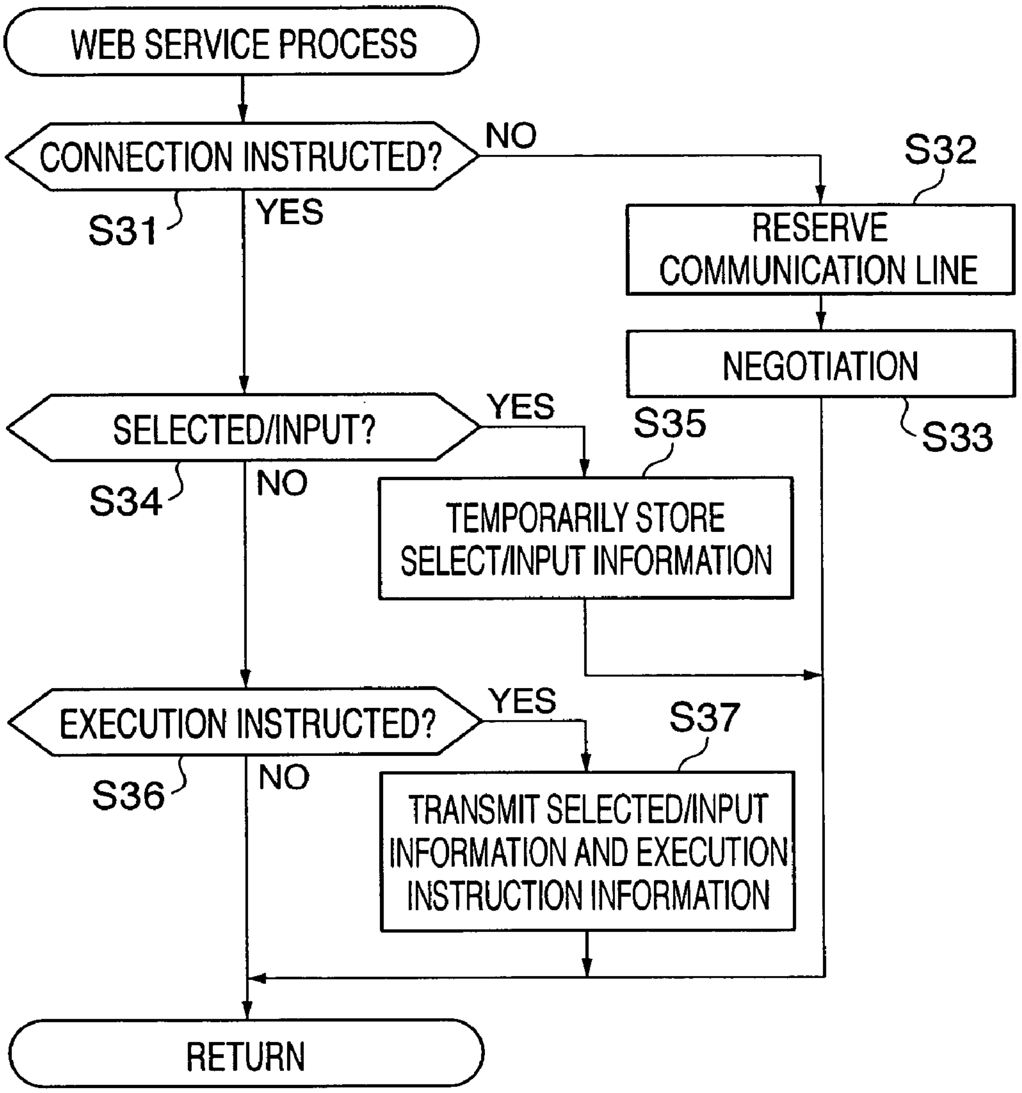
FIG. 5 is a flow chart showing in detail the procedure of a Web service processing subroutine in FIG. 4.

FIG. 5 is a flow chart showing in detail the procedure of the Web service process (B1), in which the automatic performance data editing and reproducing apparatus 1 is caused to establish connection with the Web server 102 via the communication network 101 so that the user can receive various services from the Web server 102.

As shown in FIG. 5, when the user instructs connection with the Web server 102 using the mouse and/or numerical keyboard included in the setting operating elements 3, the CPU 6 reserves a communication line with the Web server 102 on the communication network 101 via the communication I/F 13 (step S32) and carries out negotiation with the Web server 102 via the reserved communication line (step S33). The negotiation includes a process in which the communications protocol of the Web server 102 and the communications protocol of the automatic performance data editing and reproducing apparatus 1 are made consistent with each other as mentioned above in the description of the connecting process in the step S3.

Next, when the user selects information written in the service menu using the mouse and/or numerical keyboard included in the setting operating elements 3 or inputs information into an entry field written in the service menu while the automatic performance data editing and reproducing apparatus 1 is displaying the service menu on the display 10 based on the Web page data transmitted from the Web server 102 in the step S6 in FIG. 3, the selected/input information is stored in a temporary storage area, not shown, reserved on the above-mentioned RAM 8 (step S35).

Thereafter, when execution is instructed by operating an execution button (typically, a return key) included in the setting operating elements 3, the selected/input information stored in the temporary storage area as mentioned above and information indicative of the executing instruction (typically, return key information) are transmitted to the Web server 102 via the communication I/F 13 and the communication network 101 (step S37).

In the above described way, when the user instructs connection with the Web server 102, first, the automatic performance data editing and reproducing apparatus 1 and the Web server 102 are automatically and temporarily connected with each other. Next, when the user inputs a user ID and a password, the input user ID and password are transmitted to the Web server 102, and the Web server 102 carries out the authentication process based upon the user ID and the password as described above. If, as a result, the automatic performance data editing and reproducing apparatus 1 is permitted to establish connection with the Web server 102, the automatic performance data editing and reproducing apparatus 1 and the Web server 102 are fully connected with each other. Specifically, the automatic performance data editing and reproducing apparatus 1 establishes connection with the Web server 102 and becomes ready to receive various services from the Web server 102. In this state, when the user selects the accompaniment style data 220 as automatic performance data and operates the return key to request distribution thereof, information indicative of the selection of the accompaniment style data 220 and information indicative of the operation of the return key are transmitted to the Web server 102.

Figure 6:
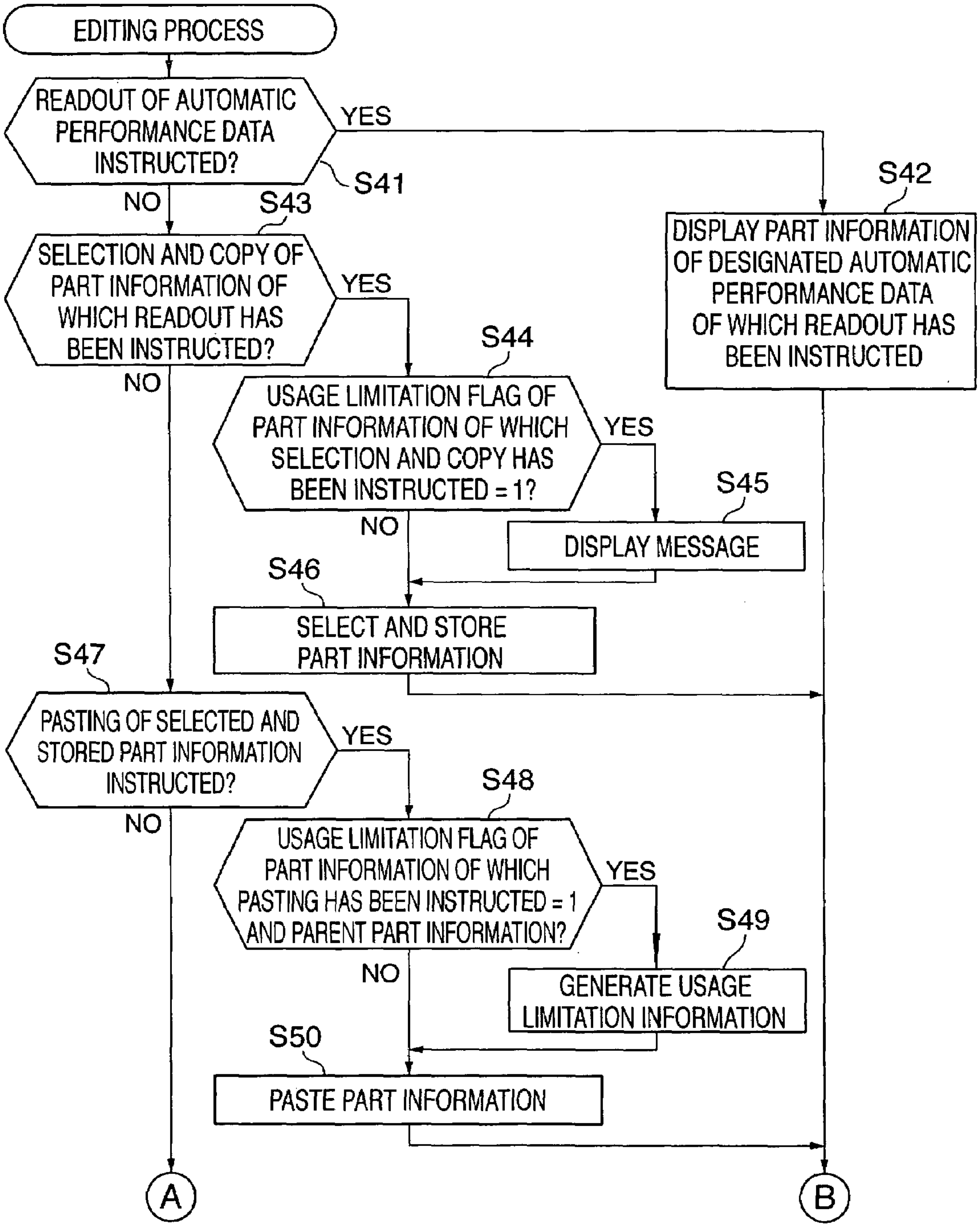
FIG. 6 is a flow chart showing in detail the procedure of an editing processing subroutine in FIG. 4.
Figure 7:
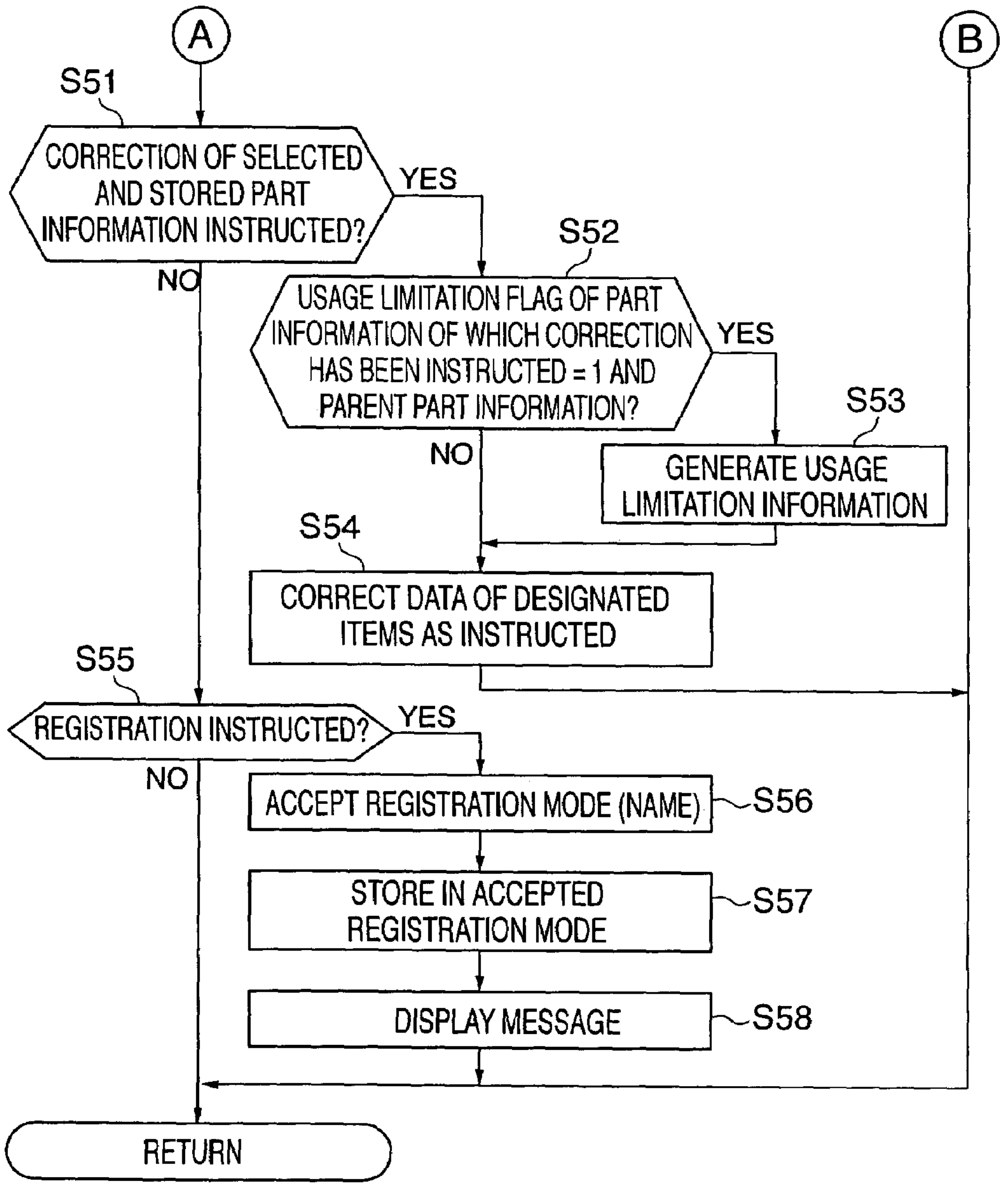
FIG. 7 is a flow chart showing a continued part of the procedure of the editing processing subroutine in FIG. 6.

FIGS.6 and 7 are flow charts showing in detail the procedure of the editing process (B2). The editing process (B2), which includes the above process (ii), is a process which is carried out to edit at least one piece of information selected from among a plurality of pieces of part information included in automatic performance data designated by the user. It is assumed that when the editing process is started, automatic performance data to be edited has already been selected by the user, downloaded from the Web server 102, and stored in an automatic performance data storage area, not shown, reserved in the RAM 8.

As shown in FIG. 6, first, when the user issues an instruction for reading out automatic performance data stored in the automatic performance data storage area, the automatic performance data is read out from the automatic performance data storage area, and all the pieces of part information constituting the automatic performance data are displayed on the display 10 (step S42). The contents of the part information displayed on the display 10 include, for example, the names of the respective pieces of part information, the states of usage limitation flags included in usage limitation information, tone color names designated by tone color designation data, and performance data displayed in the form of a musical score.

Next, in the case where the user selects one or more pieces of part information from the displayed part information and issues an instruction for copying the selected part information, if a usage limitation flag in usage limitation information provided in the selected part information of which copying has been instructed assumes "1", a message indicative of the presence of a usage limitation on the part information (for example, "the part information cannot be reproduced unless parent part information thereof is stored in the automatic performance data editing and reproducing apparatus 1") is displayed (step S45). The part information is then selected and stored in an editing area, not shown, reserved in the RAM 8 (step S46). On the other hand, if the usage limitation flag of the part information assumes "0", the part information is immediately selected and stored in the editing area (step S46).

Next, when the user issues an instruction for pasting the part information stored in the editing area to other automatic performance data, if the usage limitation flag for the part information of which pasting has been instructed assumes "1" and the part information is parent part information, new usage limitation information is generated (step S49). The generated usage limitation information is then included in the part information, and pasting of the part information is carried out (step S50). The newly generated usage limitation information includes the information that the usage limitation flag is set to "1" and the part information is child part information, as well as information indicative of the location of parent part information thereof. On the other hand, when at least one of the condition that the usage limitation flag of the part information of which pasting has been instructed assumes "1" and the condition that the part information is parent part information is unsatisfied, pasting of the part information is immediately carried out (step S50).

Next, when the user issues an instruction for correcting the part information stored in the editing area, if the usage limitation flag of the part information of which correction has been instructed assumes "1" and the part information is parent part information, new usage limitation information is generated (step S53 in FIG. 7) as in the step S49. The generated usage limitation information is included in the part information, and then data of designated items in the part information is corrected as instructed (step S54). On the other hand, if at least one of the condition that the usage limitation flag for the part information of which correction has been instructed assumes "1" and the condition that the part information is parent part information is unsatisfied, data of designated items in the part information is immediately corrected as instructed (step S54). It should be noted that in the case where the correcting instruction is an instruction for deleting the part information stored in the editing area, the part information is deleted from the editing area.

Next, when the user issues an instruction for registering the pasted part information or the corrected part information, the mode of registration input by the user (for example, registration name) is accepted (step S56), and the part information is stored in the accepted registration mode in the external storage device 11 (step S57). If the usage limitation information of the part information describes that the usage limitation flag assumes "1" and the part information is child part information, a message indicating that the part information cannot be reproduced unless parent part information thereof is stored in the automatic performance data editing and reproducing apparatus 1 is displayed (step S58). It should be noted that when usage limitation information of the concerned part information includes information indicative of the location of parent part information thereof at the present time point and the name of the parent part information, it is preferred that the location and name of the parent part information are displayed as well.

Figure 8:
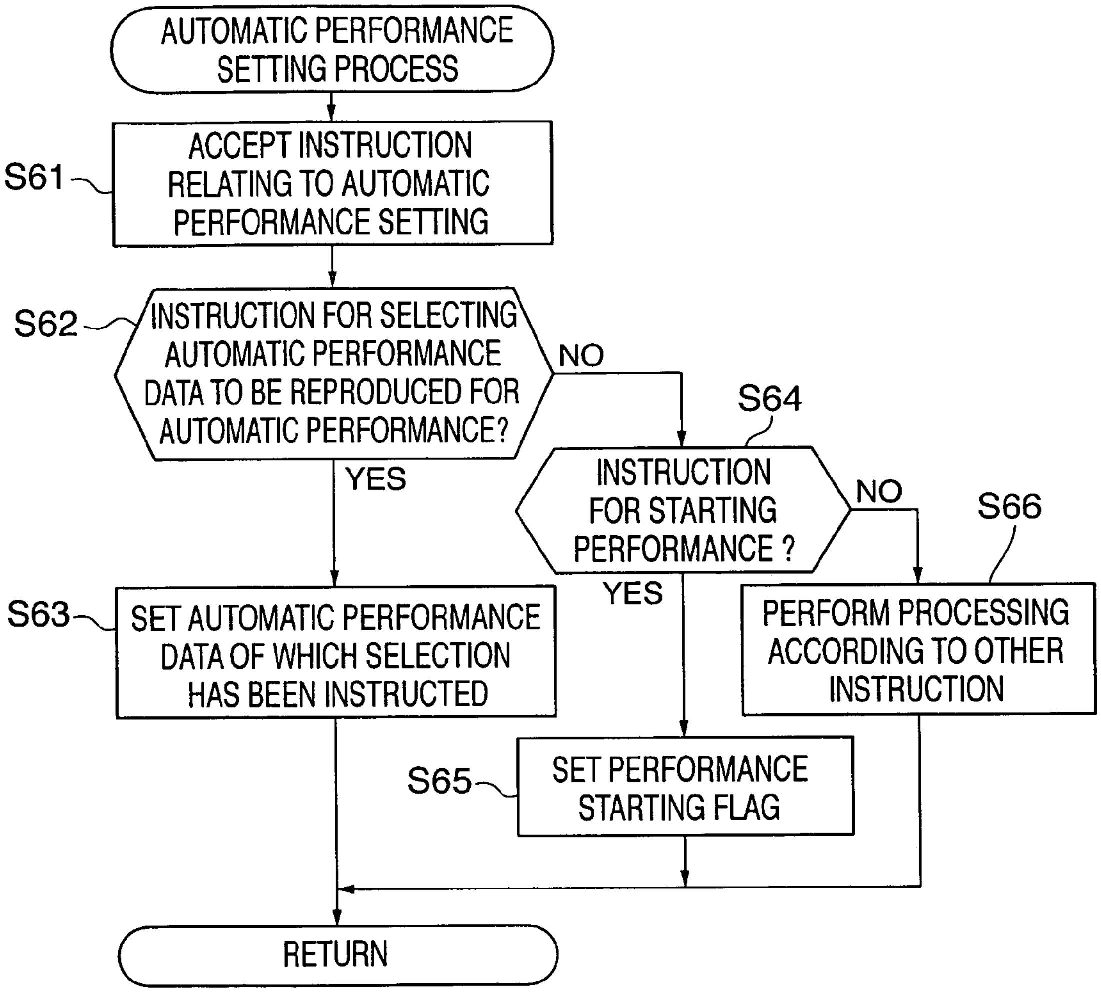
FIG. 8 is a flow chart showing in detail the procedure of an automatic performance setting processing subroutine in FIG. 4.

FIG. 8 is a flow chart showing in detail the procedure of the automatic performance setting process (B3).

As shown in FIG. 8, first, an instruction relating to automatic performance setting is accepted (step S61), and the process branches according to whether the accepted instruction is an instruction for selecting automatic performance data to be reproduced for automatic performance, an instruction for starting performance, or any other instruction.

If the accepted instruction is an instruction for selecting automatic performance data to be reproduced for automatic performance, the automatic performance data of which selection has been instructed is read out from, for example, the external storage device 11 and stored in an automatic performance data storage area, hot shown, reserved in the RAM 8 (step S63).

If the accepted instruction is an instruction for starting performance, a performance starting flag provided in the RAM 8 is set ("1") (step S65). The performance starting flag is for determining whether or not the process carried out by the CPU 6 shifts to the automatic performance process (D). When the performance starting flag assumes "1", the automatic performance process is carried out, and on the other hand, when the performance starting flag assumes "0", the automatic performance process is not carried out. That is, the above determination (i.e. determination as to whether or not automatic performance is being carried out) in a step S22 in FIG. 4 is carried out based upon the value of the performance starting flag.

Further, if the accepted instruction is any other instruction, processing is carried out in accordance with the instruction (step S66).

Figure 9:
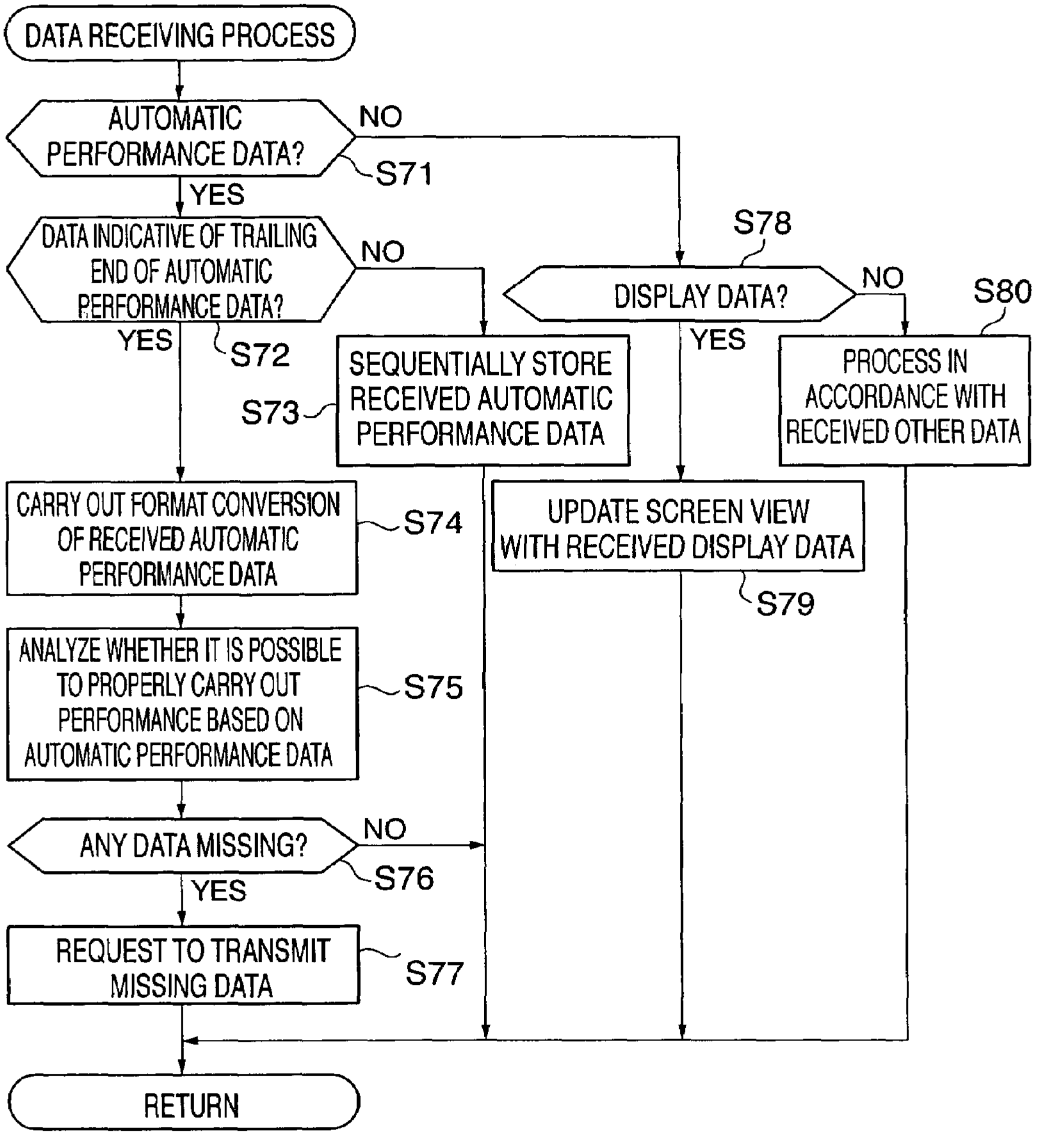
FIG. 9 is a flow chart showing in detail the procedure of a data receiving processing subroutine in FIG. 4.

FIG. 9 is a flow chart showing in detail the procedure of the data receiving process (C), which includes the above process (i). In the data receiving process, different kinds of processing are performed according to the type of received data. Here, it is assumed that the types of data to be processed in the data receiving process are mainly automatic performance data and display data, and other kinds of data are collectively handled as other data.

As shown in FIG. 9, first, when the received data is automatic performance data, the automatic performance data is stored in a received data storage area, not shown, reserved in the RAM 8 in an order in which the automatic performance data is received until data indicative of the trailing end of the automatic performance data is received, and when the data indicative of the trailing end of the automatic performance data is received, format conversion of the automatic performance data stored in the received data storage area is carried out (step S74). The received automatic performance data needs to be expanded since the automatic performance data is transmitted from the Web server 102 after being compressed using a predetermined compression method as described above. The format conversion in the step S74 means the expansion of the received automatic performance data. However, there may be a case where even uncompressed automatic performance data differs in data format that can be handled by the Web server 102 and the automatic performance data editing and reproducing apparatus 1. In this case, the automatic performance data editing and reproducing apparatus 1 cannot handle the automatic performance data received form the Web server 102 as it is, and hence the format of the automatic performance data needs to be converted into the format that can be handled by the automatic performance data editing and reproducing apparatus 1. Such format conversion is included in the format conversion in the step S74.

Next, whether or not performance (reproduction) can be properly carried out is analyzed based on the format-converted automatic performance data (step S75). If, as a result of the analysis, it is detected that performance cannot be properly carried out since the automatic performance data lacks certain data, a request to transmit the missing data is transmitted to the Web server 102 (step S77). Concrete examples of the analysis results include the determination that, where tone color designation data is written in the automatic performance data, tone color data designated by the tone color designation data does not exist in the received automatic performance data or in the automatic performance data editing and reproducing apparatus 1.

Next, when the received data is display data, the screen view on the display 10 is updated with the display data (step S79).

Further, when the received data is any other data, processing is performed in accordance with the data (step S80).

In the above described way, in the case where automatic reproduction of received automatic performance data cannot be properly carried out since the automatic performance data lacks certain data, the missing data is automatically acquired, and hence it is possible to carry out performance as intended by the creator of the automatic performance data based on the received automatic performance data. Particularly in the case where the missing data is tone color data, one used in automatic performance data is acquired as the tone color data since the tone quality of musical tones generated during the reproduction of automatic performance data depends most on tone color data. As a result, it is possible to generate musical tones with the same quality as musical tones generated by the original performance.

Although in the present embodiment, the missing data is immediately acquired from the Web server 102, the present invention is not limited to this, but first, the automatic performance data editing and reproducing apparatus 1 is searched for the missing data, and if not found, the missing data may be acquired from the Web server 102. Further, even if the missing data is not found in the automatic performance data editing and reproducing apparatus 1, when alternative data is found in the automatic performance data editing and reproducing apparatus 1, priority is given to the usage of the alternative data, and only when the user intends to use the missing data itself, the missing data may be acquired from the Web server 102.

Further, although in the present embodiment, automatic performance data and tone color data for use in the automatic performance data are separately distributed from the Web server 102, the present invention is not limited to this, but automatic performance data and tone color data for use in the automatic performance data may be collectively distributed as one set. In this case, the automatic performance data does not lack any data (especially tone color data), and hence the steps S75 to S77 may be omitted.

Figure 10:
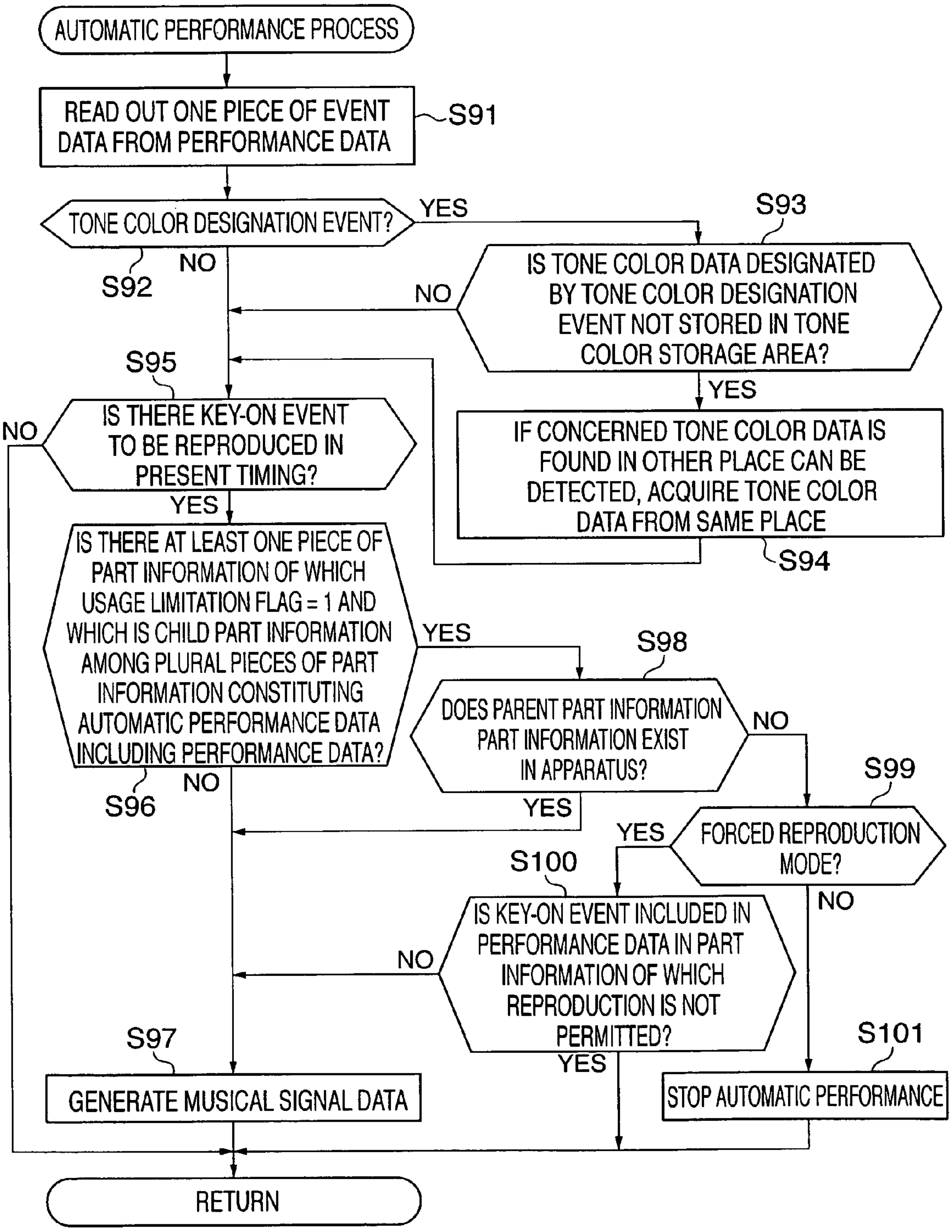
FIG. 10 is a flow chart showing in detail the procedure of an automatic performance processing subroutine in FIG. 4.

FIG. 10 is a flow chart showing in detail the procedure of the automatic performance process (D), which includes the process (iii). In the automatic performance process (D), only processes associated with a tone color designation event and a key-on event in performance data, respectively, among performance data to be reproduced for automatic performance are written, but processes associated with the other events are not written for the convenience of explanation. It goes without saying, however, that processes associated with the other events are actually carried out as well. It should be noted that the automatic performance process is carried out when the performance starting flag is set ("1")

As shown in FIG. 10, first, for example, an event data located at a position indicated by a readout pointer provided in the RAM 8 is read out from automatic performance data stored in the automatic performance data storage area (step S91).

The process then branches according to the type of the readout event data (tone color designation event or key-on event) and various conditions:

Condition 11: When the readout event data is a tone color designation event and tone color data designated by the tone color designation event is not stored in a tone color data storage area, not shown, reserved in the RAM 8, another place such as the external storage device 11 is searched for the tone color data, and if found, the tone color data is acquired from the place (step S94).

Condition 12: When the readout event data is a tone color designation event and tone color data designated by the tone color designation event is stored in the tone color data storage area, the process proceeds to the next step without doing anything. In generating a musical tone signal, the tone color data stored in the tone color data storage area is used Conditions 13: When the readout event data is not a tone color designation event, the process proceeds to the next step without doing anything.

Condition 21: When the readout event data is a key-on event and no piece of part information of which usage limitation flag assumes "1" and which is child part information exists in a plurality of pieces of part information constituting automatic performance data including performance data to be reproduced in automatic performance, a musical tone signal corresponding to the key-on event is generated (step S77).

Condition 22: When the readout event data is a key-on event, at least one piece of part information of which usage limitation flag assumes "1" and which is child part information exists in a plurality of pieces of part information constituting automatic performance data including performance data to be reproduced in automatic performance, and parent part information of the part information exists in the automatic performance data editing and reproducing apparatus 1; a musical tone signal corresponding to the key-on event is generated (step S77).

Condition 23: When the readout event data is a key-on event, at least one piece of part information of which usage limitation flag assumes "1" and which is child part information exists in a plurality of pieces of part information constituting automatic performance data including performance data to be reproduced in automatic performance, parent part information of the part information does not exist in the automatic performance data editing and reproducing apparatus 1, a forced reproduction mode is selected, and the key-on event is not included in performance data in part information of which reproduction is not permitted; a musical tone signal corresponding to the key-on event is generated (step S77).

Condition 24: When the readout event data is a key-on event, at least one piece of part information of which usage limitation flag assumes "1" and which is child part information exists in a plurality of pieces of part information constituting automatic performance data including performance data to be reproduced in automatic performance, parent part information of the part information does not exist in the automatic performance data editing and reproducing apparatus 1, the forced reproduction mode is selected, and the key-on event is included in performance data in part information of which reproduction is not permitted; a musical tone signal corresponding to the key-on event is not generated.

Condition 25: When the readout event data is a key-on event, at least one piece of part information of which usage limitation flag assumes "1" and which is child part information exists in a plurality of pieces of part information constituting automatic performance data including performance data to be reproduced in automatic performance, parent part information of the part information does not exist in the automatic performance data editing and reproducing apparatus 1, and the forced reproduction mode is not selected; automatic performance is stopped (step S101).

In the present embodiment, there are two types of reproduction modes: the forced reproduction mode and a normal reproduction mode. The reproduction mode is set in, for example, processing for another input operation in the step S19 in FIG. 4. Specifically, stopping automatic performance in the step S101 refers to resetting the performance starting flag ("0").

In the above described way, when the reproduction of at least one piece of part information among a plurality of pieces of part information constituting automatic performance data is limited (in the present embodiment, not permitted) (i.e. the usage limitation flag assumes "1", and the part information is child part information), and in trying to reproduce the part information of which reproduction is limited, when parent part information of the part information exists in the automatic performance data editing and reproducing apparatus 1, the part information of which reproduction is limited can be freely reproduced. The parent part information is one which has not been edited, and for which a creator (e.g. a right holder) thereof intends to claim originality (e.g. copyright). If the parent part information is stored in the automatic performance data editing and reproducing apparatus 1, it can be considered that the parent part information has been officially acquired (because illicitly acquired part information is normally a copy of parent part information, that is, child part information). That is, the creator of the parent part information permits the user of the apparatus in which the parent part information is stored to use the parent part information. Thus, the reproduction of child part information of which parent part information exists in the same apparatus as the one in which the parent part information is stored is permitted even if the reproduction of the child part information is limited.

On the other hand, for the reason opposite to the above reason, the reproduction of child part information of which parent part information does not exist in the same apparatus as the one in which the parent part information is stored is inhibited if the reproduction of the child part information is limited. In the normal reproduction mode, however, the reproduction of not only part information of which reproduction is limited but also the entire automatic performance data including the part information is limited.

As described above, according to the present embodiment, the right holder of automatic performance data can freely impose limitations separately on the reproduction of a plurality of pieces of part information constituting the automatic performance data, and on the other hand, the user of the automatic performance data can freely edit part information insofar as the original part information thereof is stored in advance in the apparatus even if the reproduction of the part information is limited. It is therefore possible to achieve harmony between the right holder of automatic performance data and the user thereof. Also, the right can be claimed to only a selected part of automatic performance data, not to the entire automatic performance data, which is convenient for a right holder who does not intend to claim the right to the entire automatic performance data.

Although in the present embodiment, whether or not parent part information exists in the automatic performance data editing and reproducing apparatus 1 is determined according to whether or not information indicative of the location at which the parent part information exists is written in usage limitation information on child part information of the parent part information, and the location at which the parent part information actually exists is not detected, this is not limitative, but it may be determined that parent part information exists in the automatic performance data editing and reproducing apparatus 1 when the location at which the parent part information actually exists is detected. Also, even when information indicative of the location at which parent part information exists is not written in usage limitation information on child part information, it may not immediately be determined that the parent part information does not exist in the automatic performance data editing and reproducing apparatus 1, but an attempt is made to detect the location at which parent part information actually exists, and when, as a result, it is found that the parent part information does not actually exist, it may be determined that the parent part information does not exist in the automatic performance data editing and reproducing apparatus 1.

Further, although in the present embodiment, parent part information is edited to generate child part information, the child part information may be edited to generate grandchild part information, and further, the grandchild part information may be edited to generate great-grandchild part information. The reproduction of the grandchild part information and the great-grandchild part information may also be limited if parent part information thereof is stored in the apparatus in which the grandchild part information and the great-grandchild part information are stored.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded from a server computer via a communication network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An automatic performance data editing and reproducing apparatus comprising:

a storage device that stores automatic performance data comprising a plurality of original pieces of part performance data, wherein at least one of the original pieces thereof includes an identifier that indicates that reproduction of performance based thereon is to be limited;

a readout device that reads out at least one of the original pieces of the part performance data stored in said storage device;

an editing device that edits the original one piece of the part performance data read out by said readout device; and a reproducing device that reproduces performance based on the automatic performance data, including the edited one piece of the part performance data edited by said editing device, wherein said editing device generates a condition for removing the limitation on reproduction of performance based on the edited one piece and attaches the generated condition to the edited one piece when the original one piece of the part performance data read out by the readout device includes the identifier, wherein said reproducing device removes the limitation on the reproduction of performance based on the edited one piece when the condition is satisfied, and wherein the condition is satisfied when the original one piece of the part performance data read out by the readout device is stored in the storage device.

2. The automatic performance data editing and reproducing apparatus according to claim 1, wherein said readout device reads out a copy of the original one piece of the part performance data, and said editing device edits the copy of the one original piece of the part performance data read out.

3. The automatic performance data editing and reproducing apparatus according to claim 2, wherein said readout device reads out the copy of the edited one piece of the part performance data edited by said editing device, and said editing device further edits the edited one piece.

4. The automatic performance data editing and reproducing apparatus according to claim 1, further comprising a selecting device that selects either one of a first reproduction mode or a second reproduction mode, and wherein said reproducing device limits reproduction of performance based on the edited one piece of the part performance data with the condition when the condition is unsatisfied and said selecting device selects either the first reproduction mode where reproduction of performance thereof is based on another original piece of the part performance data, or the second reproduction mode where reproduction of performance on the entire automatic performance data is limited.

5. Then automatic performance data editing and reproducing apparatus according to claim 1, wherein the plurality of original pieces of the part performance data include pieces for an introduction part of a musical composition, for a main part of the musical composition, for break parts of the musical composition, and for an ending part of the musical composition.

6. The automatic performance data editing and reproducing apparatus according to claim 1, wherein the content of the identifier is settable by a creator of the automatic performance data.

7. A control method for an automatic performance data editing and reproducing apparatus having a storage device that stores automatic performance data comprising a plurality of original pieces of part performance data, wherein at least one of the original pieces thereof contains an identifier that indicates that reproduction of performance based thereon is to be limited, the method comprising:

a readout step of reading out at least one of the original pieces of the part performance data stored in the storage device;

an editing step of editing the original one piece of the part performance data read out in said readout step; and a reproducing step of reproducing performance based on the automatic performance data, including the edited one piece of the part performance data edited in said editing step, wherein the editing step generates a condition for removing the limitation on reproduction of performance based on the edited one piece of the part performance data and attaches the generated condition to the edited one piece when the original one piece read out in the readout step includes the identifier, wherein said reproducing step removes the limitation on the reproduction of performance based on the edited one piece of the part performance data when the condition is satisfied, and wherein the condition is satisfied when the original one piece of the part performance data read out by the readout device is stored in the storage device.

8. A computer-readable medium storing a computer program for controlling an automatic performance data editing and reproducing apparatus having a storage device that stores automatic performance data comprising a plurality of original pieces of part performance data, wherein at least one of the original pieces thereof contains an identifier that indicates that reproduction of performance based thereon is to be limited, the program comprising:

a readout module for reading out at least one of the original pieces of the part performance data stored in the storage device;

an editing module for editing the original one piece of the part performance data read out by said readout module; and a reproducing module for reproducing performance based on the automatic performance data, including the edited one piece of the part performance data edited by said editing module, wherein the editing module generates a condition for removing the limitation on reproduction of performance based on the edited one piece of the part performance data and attaches the generated condition to the edited one piece when the original one piece read out by the readout module includes the identifier, wherein said reproducing module removes the limitation on the reproduction of performance based on the edited one piece of the part performance data when the condition is satisfied, and wherein the condition is satisfied when the original one piece of the part performance data read out by the readout device is stored in the storage device.

9. An automatic performance data editing and reproducing apparatus comprising:

a storage device that stores automatic performance data comprising a plurality of original pieces of part performance data, wherein at least one of the original pieces thereof includes an identifier that indicates that reproduction of performance based thereon is to be limited;

a readout device that reads out at least one of the original pieces of the part performance data stored in said storage device;

an editing device that edits the original one piece of the part performance data read out by said readout device; and a reproducing device that reproduces performance based on the automatic performance data, including the edited one piece of the part performance data edited by said editing device, wherein said editing device generates a condition for removing the limitation on reproduction of performance based on the edited one piece and attaches the generated condition to the edited one piece when the original one piece of the part performance data read out by the readout device includes the identifier, wherein said reproducing device removes the limitation on the reproduction of performance based on the edited one piece when the condition is satisfied, and wherein reproduction of the edited one piece is inhibited when the generated condition does not include information indicative of the location of where the original one piece thereof is stored.

10. A control method for an automatic performance data editing and reproducing apparatus having a storage device that stores automatic performance data comprising a plurality of original pieces of part performance data, wherein at least one of the original pieces thereof contains an identifier that indicates that reproduction of performance based thereon is to be limited, the method comprising:

a readout step of reading out at least one of the original pieces of the part performance data stored in the storage device;

an editing step of editing the original one piece of the part performance data read out in said readout step; and a reproducing step of reproducing performance based on the automatic performance data, including the edited one piece of the part performance data edited in said editing step, wherein the editing step generates a condition for removing the limitation on reproduction of performance based on the edited one piece of the part performance data and attaches the generated condition to the edited one piece when the original one piece read out in the readout step includes the identifier, wherein said reproducing step removes the limitation on the reproduction of performance based on the edited one piece of the part performance data when the condition is satisfied, and wherein reproduction of the edited one piece is inhibited when the generated condition does not include information indicative of the location of where the original one piece thereof is stored.

11. A computer-readable medium storing a computer program for controlling an automatic performance data editing and reproducing apparatus having a storage device that stores automatic performance data comprising a plurality of original pieces of part performance data, wherein at least one of the original pieces thereof contains an identifier that indicates that reproduction of performance based thereon is to be limited, the program comprising:

a readout module for reading out at least one of the original pieces of the part performance data stored in the storage device;

an editing module for editing the original one piece of the part performance data read out by said readout module; and a reproducing module for reproducing performance based on the automatic performance data, including the edited one piece of the part performance data edited by said editing module, wherein the editing module generates a condition for removing the limitation on reproduction of performance based on the edited one piece of the part performance data and attaches the generated condition to the edited one piece when the original one piece read out by the readout module includes the identifier, wherein said reproducing module removes the limitation on the reproduction of performance based on the edited one piece of the part performance data when the condition is satisfied, and wherein reproduction of the edited one piece is inhibited when the generated condition does not include information indicative of the location of where the original one piece thereof is stored.

* * * * *